Dec. 5, 1939.        A. Y. DODGE         2,182,621
              TRANSMISSION
         Filed Oct. 12, 1935       2 Sheets-Sheet 2
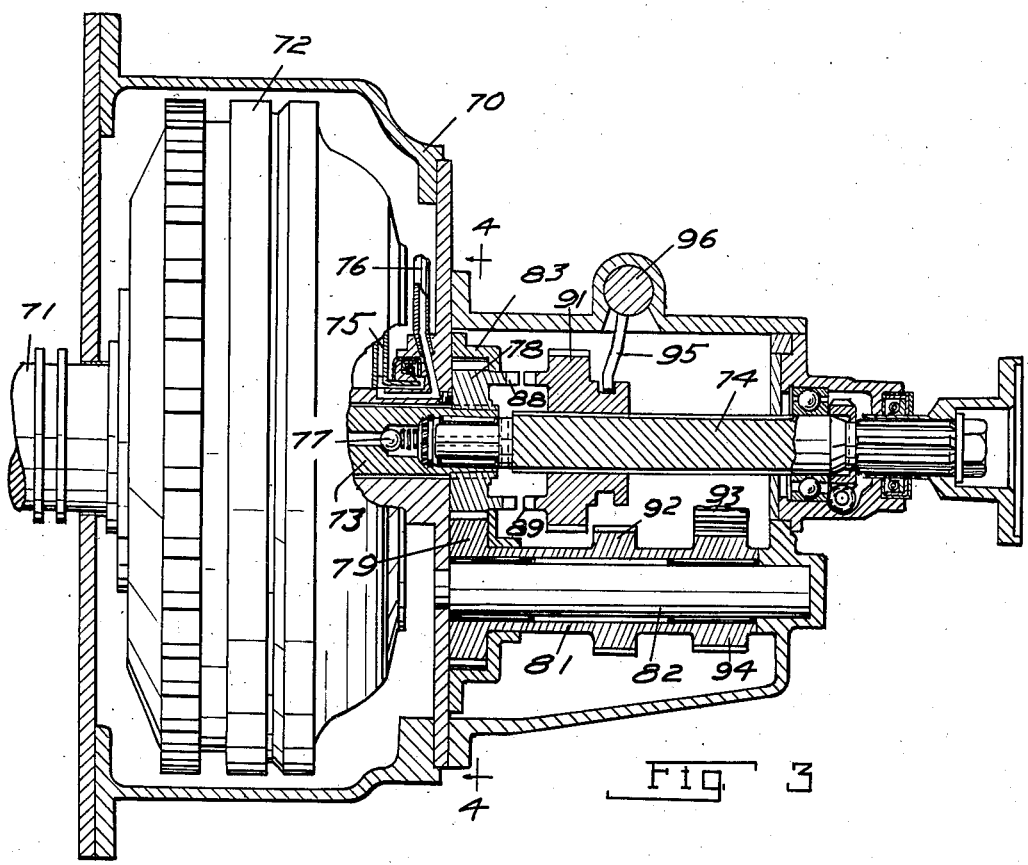
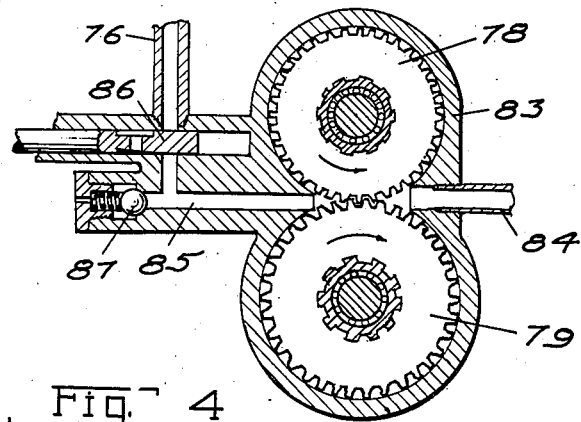
INVENTOR.
ADIEL Y. DODGE
BY McConkey & Booth
ATTORNEYS.

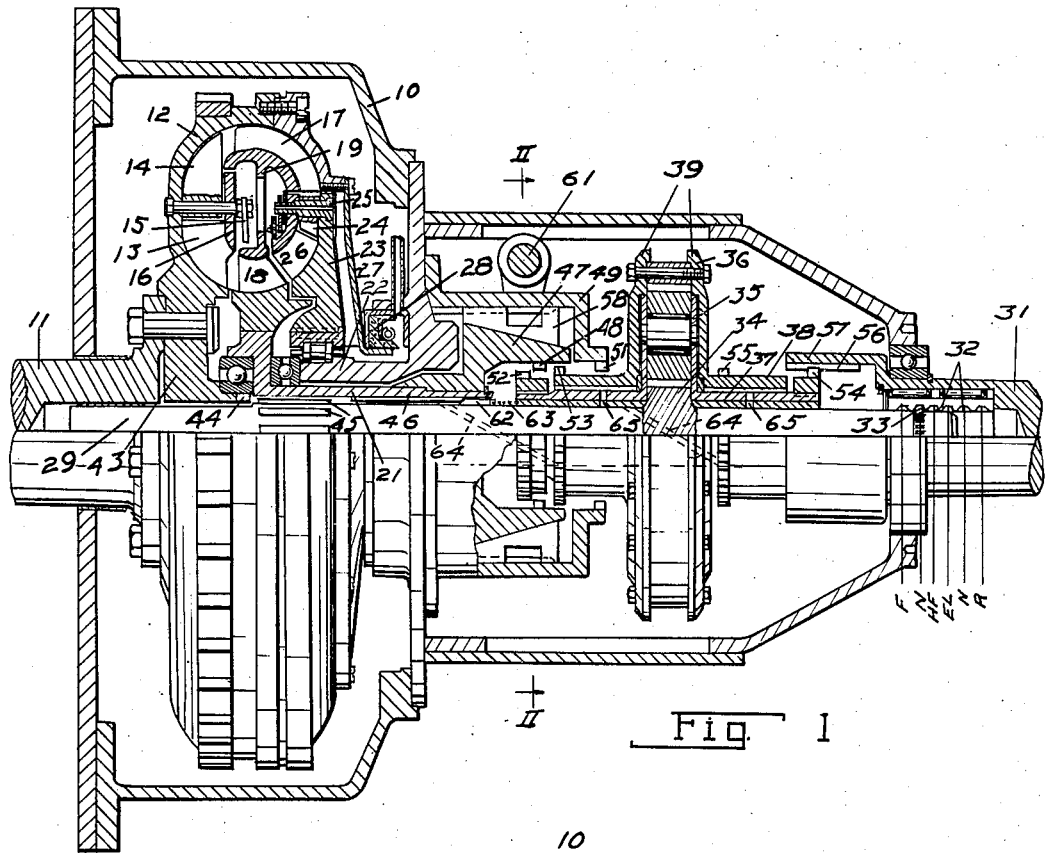

Patented Dec. 5, 1939

2,182,621

UNITED STATES PATENT OFFICE 2,182,621

TRANSMISSION

Adiel Y. Dodge, South Bend, Ind.

Application October 12, 1935, Serial No. 44,672

7 Claims. (Cl. 74—189.5)

This invention relates to transmissions and more particularly to transmissions including a hydraulic torque converter and a gear chain for providing automatically variable torque ratios.

One of the objects of the invention is to provide a transmission including a hydraulic torque converter which eliminates the necessity for the usual friction clutch.

Another object is to provide a transmission including a hydraulic torque converter in which liquid is circulated through the converter during operation and in which the converter is maintained full of liquid during stopping.

Another object is to provide a transmission including a hydraulic torque converter and a gear chain in which controllable means are provided for varying the driving connections to produce various forward driving relationships or reverse drive.

Other objects, advantages and novel features including novel sub-combinations and particular elements will be apparent from the following description when read in connection with the accompanying drawings in which:

Figure 1 is a central section with parts in elevation of a transmission embodying the invention;

Figure 2 is a partial section on the line II—II of Figure 1, parts being omitted in half of the figure to show the control for shifting the planetary unit;

Figure 3 is a central section with parts in elevation of a modified transmission; and Figure 4 is partial section on the line IV—IV of Figure 3.

The illustrated embodiments comprise generally a hydraulic torque converter including an impeller connected to a driving shaft, a stator, and a rotor. In one form the rotor is connected to a clutch member which is shiftable selectively into or out of engagement with any one of the elements of a planetary gear chain, which likewise includes clutch members engageable with a driven shaft. In this form the driving shaft is also provided with a clutch member directly engageable with one of the elements of the planetary gear chain whereby a two path drive may be produced or the torque converter and gear chain can be connected in tandem for forward drive or for reverse.

In the other form illustrated the rotor is connected to a spur gear permanently meshing with a gear on a lay shaft and the driven shaft slidably carries a gear engageable with the rotor gear or with other gears on the lay shaft. By shifting the last gear the gear chain may produce a direct drive, a low gear drive or reverse.

Advantage is taken of the permanently meshed gears to provide a liquid gear pump for circulating liquid through the torque converter by encasing the gears and making suitable inlet and outlet connections thereto. By placing a controllable valve in the gear pump outlet, this arrangement can also be made to serve as a hydraulic brake for the rotor to facilitate shifting of the gears. A similar brake, shown as a cone friction type, is preferably provided in the first form for a similar purpose.

Liquid is circulated through the torque converters in both forms of the invention illustrated and its outlet may be controlled by a pressure responsive valve which will yield to pressure during operation but which will prevent flow during stopping to maintain the torque converter full of liquid. By providing suitable passages this circulating liquid may also be made to serve as a lubricant for the various bearings and the like.

Referring more particularly to Figures 1 and 2 the transmission illustrated consists of a housing 10 adapted to be mounted in an automobile or the like and a driving shaft 11 which may be the crankshaft of an internal combustion engine extending through one end of the housing.

The shaft 11 is connected to the impeller of a hydraulic torque converter which may take the form of that shown in any of my copending applications Serial Nos. 34,303, 3,544 or 723,083. As shown the torque converter includes a casing 12 which is connected to the shaft 11 and which has secured thereto to rotate therewith a series of fixed impeller vanes 13 and a series of pivoted impeller vanes 14. The vanes 14 form the outlet of the impeller and their position about their pivots is controlled by the joint action of the liquid and by centrifugal weights 15 as more fully described in application Serial No. 34,303. The inner edges of the vanes 13 support a plate 16 forming one side of a hollow core.

Adjacent the inlet and outlet ends of the impeller vanes two series of rotor vanes 17 and 18 are arranged and are secured to the opposite sides of an annular member 19 having flanged portions supporting the vanes 17 and 18 and also forming parts of the hollow core. The rotor is carried by a sleeve 21 which is rotatably journaled in a sleeve 22 on the casing 10 and the member 19 is provided with a series of openings to permit free flow of liquid through the core.

A stator 23 is rotatably mounted on the sleeve 22 on a combined bearing and one-way clutch and has a series of vanes 24 mounted on a hollow pivot 25 and a series of rigid vanes 26. The sets of vanes 25 and 26 are arranged between the two sets of rotor vanes 17 and 18.

Liquid is circulated through the torque converter by a centrifugal pump shown as a plate 27 connected to the impeller casing 12 and having a series of radial vanes on its interior surface. The outer ends of the passage formed between the plate 27 and the stator communicate with the hollow pivots 25 and the inner end of the plate is sealed as at 28. Liquid may be fed into the inner ends of the passages adjacent the seal 28 by any suitable form of feed pump or by gravity and will be forced out by the feed pump through the pivots 25 and into the core of the torque converter. From this point the liquid will be forced out through the spaces between the impeller, the rotor and the stator into the liquid path provided by the vanes.

An intermediate shaft 29 has one end slidably journaled in the end of the driving shaft 11 and its opposite end similarly journaled in a driven shaft 31. If desired the driven shaft may carry a bearing whose inner race has a series of annular grooves 32 for cooperation with a spring detent 33 carried by the shaft 29 to yieldingly hold the shaft 29 in any desired axial position.

The shaft 29 may carry or have integrally formed thereon a spur gear 34 which serves as the sun gear of a planetary gear chain including a gear carrier 35 carrying a single set of planet gears and a ring gear 36. The planet carrier and ring gear are rotatably supported on the shaft 29 by concentric sleeves 37 and 38 respectively and the entire planetary gear chain is shiftable as a unit with the shaft 29. If desired the ring gear 36 may be provided with spaced peripheral flanges 39 for engagement by a shifting block or yoke 41 (Figure 2) which is controlled through a shift rod 42 in any desired manner to shift the planetary gear chain and shaft 29 axially.

In order to connect the torque converter and gear chain to provide driving connections bebetween the driving and driven shafts, the impeller 12 carries a sleeve 43 terminating in a set of clutch teeth 44 and the shaft 29 is formed with splines 45 adapted to engage the teeth 44 when in one position. The sleeve 21 has a series of internal splines 46 spaced from the teeth 44 and adapted to engage the splines 45 when the shaft 29 is shifted to another position. The sleeve 21 also carries at its end a conical block 47 having on its inner surface a set of clutch teeth 48, and a stationary sleeve 49 fixed to the casing 10 carries a similar set of teeth 51.

The sleeves 37 and 38 both have at one end sets of external teeth 52 and 53 respectively which are adapted to engage the teeth 48 or 51 when the shaft 29 is shifted to bring the sets of teeth into register. At their opposite ends the sleeves 37 and 38 carry similar sets of teeth 54 and 55 respectively which are adapted to mesh with internal elongated teeth 56 formed on a sleeve 57 carried by the driven shaft.

To facilitate engagement of the various sets of clutch teeth during operation, a cone brake may be splined in the sleeve 49 for engagement with the conical outer surface of the block 47. The brake 58 may be operated by a yoke 59 (Figure 2) which is controlled by a shaft 61 which in turn may be controlled by a suitable pedal corresponding to the usual clutch pedal or which may be operated automatically as the shaft 42 is operated. When the brake 58 is engaged it slows down or stops the sleeve 21 and the rotor thus enabling the clutches to be shifted readily and since this operation is usually performed when the engine is idling, the torque converter will not exert much force on the brake. If the shifting is to be performed during operation, the brake 58 may be operated to slow the clutch member 48 down to the speed of that with which it is to be engaged, thus making shifting easier under these circumstances.

The splines between the brake 58 and the sleeve 49 are preferably such as to allow a limited back lash or reverse movement of the brake, such as 15°. If desired, a spring may be provided to hold the splines in engagement at one end to reduce noise. In this way when the splines 45 start to engage the clutch teeth 44, the ring gear will be permitted to turn backwards through an angle of approximately 45°, assuming a 3 to 1 ratio between the sun and ring gears. This provides sufficient time to fully engage the splines 45 and teeth 44 before any substantial load is placed thereon.

In order to permit free flow of liquid through the torque converter during operation, a space is left between the impeller and rotor rings at the inside of the fluid path, through which liquid can flow out of the converter under pressure of incoming liquid from the pump 27. This liquid flows out between the sleeve 21 and shaft 29 around the splines 45 and 46, thus lubricating these parts. An annular sleeve 62 is slidably mounted on the shaft 29 and is held in sealing engagement with the ends of the splines 46 by a spring 63 so that when there is no pressure on the liquid, as when the engine is stopped, flow of liquid will be prevented and the torque converter will be kept full of liquid. However, during operation the liquid pressure induced by the pump 27 is sufficient to unseat the valve 62 against its spring 63 and permit flow of liquid past the clutches and back into the gear casing from which point it may be forced through a suitable cooling unit, not shown, and back to the pump 27.

If it is desired to use the same liquid for lubrication of the transmission parts, suitable passages 64 may be provided in the shaft 29 for conducting the liquid from the splines 46 to the bearing surfaces between the shaft 29 and sleeve 37, the latter preferably being drilled as at 65 to conduct the liquid to the bearing surfaces on which the sleeve 38 revolves. It will be noted that the gear chain may be lubricated by splashing in liquid in the gear case and that liquid passing between the rotor and stator will flow through the combined bearing and one-way clutch on which the stator is mounted to lubricate it and then back to the inlet of the pump 27.

With the parts in the position shown and detent 33 on the line marked N there is no connection between the driving shaft or the torque converter and the gear chain and the transmission is in a neutral condition. If the parts are shifted to the left to bring detent 33 in the F position splines 45 will engage clutch 44 and clutch 53 will engage clutch 48, clutches 54 and 56 being engaged. Thus the gear carrier will be connected to the driven shaft, the sun gear will be connected to the driving shaft and the ring gear will be connected to the rotor. This is the normal forward drive position providing two paths of power flow and automatic infinitely variable driving ratios up to one to one.

With this gearing connection a vehicle can be held stationary by its own brakes with its engine idling, operation of the engine merely turning the ring gear and rotor backwards at a relatively low speed. If the engine is speeded up resistance to reverse rotation of the rotor increases until the driven shaft starts turning forwardly and gradually the ring gear will be rotated forwardy through the action of the torque converter unti it is turning at the same speed as the driving shaft. At this time the gear chain will turn as a unit and the driven shaft will be driven at the same speed and torque as the driving shaft. If it is desired to start the vehicle at a very low engine speed or against a relatively heavy load the brake 58 may be engaged to hold the rotor and ring gear against rotation thus giving a positive starting, the brake being released after the vehicle is started to permit the ring gear to be driven forwardly by the rotor.

When the detent 33 is shifted to the HF or hydraulic forward position the clutch teeth 52 will be engaged with the teeth 48, clutches 54 and 56 remaining in engagement. Thus the rotor and driven shaft are both connected to the gear carrier and the driven shaft will be driven solely through the torque converter. If it is desired to eliminate this driving connection, the teeth 48 and 52 can both be formed of half depth so that they will clear instead of engaging and the HF position will become another neutral.

When the detent 33 is moved into the EL position, the clutch 53 will engage the fixed clutch 51, the splines 45 will engage with the splines 46 and the clutch 54 will remain in engagement with the clutch 56. In this position the ring gear 36 is held stationary and the shaft 29 and sun gear 34 will be connected to the rotor with the gear carrier connected to the driven shaft. Thus the torque converter drives the sun gear and the carrier drives the driven shaft at reduced speed and increased torque varying from the product of the gear chain and the maximum torque increase of the torque converter to the fixed torque increase produced in the gear chain as the torque converter reaches a one to one drive.

The next N represents another neutral position in which neither of the clutches 52 or 53 is engaged and in which there is no connection between the driving and driven shafts.

In the R or reverse position the clutch 55 engages the clutch 56 and the clutch 52 engages the clutch 51, splines 45 remaining in engagement with the splines 46. Thus the gear carrier is held stationary, the sun gear is connected to the rotor and the ring gear is connected to the driven shaft so that the ring gear will be driven in the reverse direction.

Figures 3 and 4 illustrate a modified construction including a housing 70 having a driving shaft 71 extending through one end thereof and connected to a hydraulic torque converter 72 which may be the same as that described in connection with Figures 1 and 2 or in any of my copending applications identified above.

The rotor of the torque converter is connected to a drilled shaft 73 in one end of which a driven shaft 74 is journaled. The torque converter includes a centrifugal pump 75 for forcing liquid therethrough, the liquid being supplied through a pipe 76 from a feed pump to be described later and being forced out through the shaft 73 past a spring pressed check valve 77 and into the gear casing. The valve 77 functions in the same manner as the valve 62 of Figures 1 and 2 to permit circulation of liquid during operation but to prevent draining of liquid from the torque converter when it is stopped.

A spur gear 78 is splined to the end of the shaft 73 and is in constant mesh with a gear 79 fixed to a sleeve 81 journaled on a lay shaft 82 which is fixed in the housing 70. The gears 78 and 79 are enclosed about their peripheries by a casing 83 to form a gear pump having an inlet pipe 84 which may lead from the lower part of the gear housing or from any other suitable source of liquid supply. The pump has an outlet 85 connected to the pipe 76 to supply liquid to the pump 75.

The passage 85 is controlled by a sliding valve 86 which may be operated by a pedal corresponding to the usual clutch pedal and when the valve 86 is closed resistance is imposed on the pump thus tending to brake the pump and consequently the rotor of the torque converter. In order to prevent damage due to building up of too much pressure should the valve 86 be closed when the gears are turning at a high speed, a relief valve 87 is provided in the passage 85 to yield under a predetermined pressure and by-pass liquid back to the source.

The gear 78 carries a set of clutch teeth 88 adapted to engage a set of clutch teeth 89 on a gear 91 which is slidably splined on the driven shaft. The gear 91 is also engageable with a gear 92 formed on the sleeve 81 and with an idler 93 meshing with a reverse gear 94 formed on the sleeve 81. The gear 91 may be shifted by a yoke 95 controlled by a shaft 96 which may be operated by any suitable shifting lever.

The position shown is the neutral position in which there is no connection between the driving and driven shafts. If the gear 91 is shifted to engage the clutches 88 and 89 the shaft 73 and the rotor of the torque converter are connected directly to the driven shaft and the only torque multiplication is that produced in the torque converter and may vary from about 3.5 to 1 to 1 to 1. If the gear 91 is shifted into mesh with the gear 92, the drive is from the rotor to gear 78 to gear 79 and through sleeve 81 to gear 92 and to gear 91 thus driving the driven shaft with a further mechanical torque multiplication.

When the gear 91 is shifted into mesh with the reverse idler 93 the driven shaft will be rotated in reverse with a torque multiplication equal to the product of that produced by the torque converter and that produced by the gear chain.

While only two embodiments of the invention have been shown and described, it will be apparent that many changes might be made therein and it is not intended to be limited to the forms shown or otherwise than by the terms of the appended claims.

I claim:

1. A transmission comprising, a hydraulic torque converter including driving and driven members, driving means connected to said driving member, clutch means connected to said driving and driven members, a gear chain having a plurality of elements, clutch means connected to said elements, and control means for selectively connecting the last named clutch means to the first named clutch means to provide different driving relations between the torque converter and the gear chain.

2. A transmission comprising, a hydraulic torque converter including driving and driven members, driving means connected to the driving member, clutch means connected to said driving and driven members, a gear chain having a plurality of elements, clutch means connected to said elements, and control means for selectively connecting the last named clutch means to the first named clutch means to connect one of said elements to the driving member and another element to the driven member or to connect one of the elements to the driven member.

3. A transmission comprising, a hydraulic torque converter including driving and driven members, driving means connected to the driving member, clutch means connected to said driving and driven members, a gear chain having a plurality of elements, clutch means connected to said elements, a driven shaft, clutch means connected to said driven shaft, and control means to selectively connect the last named clutch means to the first named clutch means to connect said two members to two of said elements respectively and a third element to said driven shaft or to connect said driven member directly to said driven shaft, or to connect said driven member to one of said elements and the driven shaft to another of the elements.

4. A transmission comprising, a hydraulic torque converter including an impeller and a rotor, a driving shaft connected to the impeller, a second shaft coaxial with said driving shaft and slidable axially relatively thereto, a gear chain carried by said second shaft and slidable therewith, and clutch means on said torque converter and said gear chain controlled by sliding of said second shaft.

5. A transmission comprising, a hydraulic torque converter including an impeller and a rotor, a driving shaft connected to the impeller, a second shaft coaxial with said driving shaft and slidable axially relatively thereto, a gear chain carried by said second shaft and slidable therewith, and clutch means on said torque converter and said gear chain controlled by sliding of said second shaft, and cooperating clutch means on said driving and second shafts controlled by sliding of the second shaft.

6. A transmission for connecting driving and driven members comprising a hydraulic torque converter having a vaned impeller connected to the driving member and a vaned rotor, the impeller tending to turn the rotor in the same direction in which it is rotating, a differential gear set having means to connect one element to the driving member, means to connect another element to the rotor and means to connect a third element to the driven member, said gear set being so constructed and arranged that, when the driven member is stationary or is turning at a speed less than the speed of the driving member times the normal gear ratio, the rotor and its connected element will be rotated reversely to increase the relative rotation between the rotor and impeller, thereby to increase the torque transmitted by the hydraulic torque converter.

7. A transmission for connecting driving and driven members comprising a hydraulic variable speed torque-multiplying unit having a vaned impeller connected to the driving member, a vaned rotor and a vaned stator, the impeller tending to turn the rotor in the same direction in which it is rotating at speeds varying through an infinite range up to one to one, a differential gear set having means to connect one element to the driving member, means to connect another element to the rotor and means to connect a third element to the driven member, said gear set being so constructed and arranged that when the driven member is stationary or is turning at a speed less than the speed of the driving member times the normal gear ratio, the rotor and its connected element will be rotated reversely to increase the relative rotation between the rotor and impeller, thereby to increase the torque transmitted by the hydraulic unit.

ADIEL Y. DODGE.